United States Patent
Berlinger et al.

(10) Patent No.: US 9,816,887 B2
(45) Date of Patent: Nov. 14, 2017

(54) CERAMIC PRESSURE MEASURING CELL AND METHOD FOR ITS MANUFACTURE

(75) Inventors: Andrea Berlinger, Baden-Baden (DE); Ulfert Drewes, Mullheim (DE); Andreas Rossberg, Bad Sackingen (DE); Elke Schmidt, Bad Sackingen (DE); Thomas Uehlin, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 844 days.

(21) Appl. No.: 14/004,228

(22) PCT Filed: Feb. 10, 2012

(86) PCT No.: PCT/EP2012/052310
§ 371 (c)(1),
(2), (4) Date: Sep. 10, 2013

(87) PCT Pub. No.: WO2012/123199
PCT Pub. Date: Sep. 20, 2012

(65) Prior Publication Data
US 2016/0370241 A1 Dec. 22, 2016

(30) Foreign Application Priority Data
Mar. 16, 2011 (DE) .................. 10 2011 005 665

(51) Int. Cl.
*G01L 9/12* (2006.01)
*G01L 9/00* (2006.01)
(Continued)

(52) U.S. Cl.
CPC ............ *G01L 9/0048* (2013.01); *B23K 1/008* (2013.01); *B23K 1/0016* (2013.01);
(Continued)

(58) Field of Classification Search
None
See application file for complete search history.

(56) References Cited

U.S. PATENT DOCUMENTS

| 5,334,344 A | 8/1994 | Hegner |
| 5,407,119 A | 4/1995 | Churchill |

(Continued)

FOREIGN PATENT DOCUMENTS

| DE | 102007047014 A1 | 2/2009 |
| DE | 102010018377 A1 | 4/2011 |

(Continued)

OTHER PUBLICATIONS

English translation of International Preliminary Report, WIPO, Geneva, dated Sep. 29, 2013.

(Continued)

*Primary Examiner* — Andre Allen
(74) *Attorney, Agent, or Firm* — Bacon & Thomas, PLLC

(57) ABSTRACT

A method for manufacturing a pressure measuring cell, which has a ceramic platform and a ceramic measuring membrane, wherein the measuring membrane is joined with the platform pressure tightly by an active hard solder, or braze, wherein the method includes: providing the platform, the measuring membrane and the active hard solder, or braze, positioning the active hard solder, or braze, between the platform and the measuring membrane; melting the active hard solder, or braze, by irradiating the active hard solder, or braze, by a laser, wherein the irradiating of the active hard solder, or braze, occurs through the measuring membrane; and letting the active hard solder, or braze, solidify by cooling.

14 Claims, 2 Drawing Sheets

(51) Int. Cl.
- C04B 35/111 (2006.01)
- C04B 37/00 (2006.01)
- B23K 26/211 (2014.01)
- B23K 26/32 (2014.01)
- B23K 1/00 (2006.01)
- B23K 1/008 (2006.01)
- B23K 35/30 (2006.01)
- B23K 35/32 (2006.01)
- C22C 16/00 (2006.01)
- C22C 30/02 (2006.01)
- B23K 103/00 (2006.01)
- B23K 103/16 (2006.01)
- B23K 101/40 (2006.01)

(52) U.S. Cl.
CPC ............ *B23K 26/211* (2015.10); *B23K 26/32* (2013.01); *B23K 35/302* (2013.01); *B23K 35/32* (2013.01); *C04B 35/111* (2013.01); *C04B 37/006* (2013.01); *C22C 16/00* (2013.01); *C22C 30/02* (2013.01); *G01L 9/0075* (2013.01); *B23K 2201/40* (2013.01); *B23K 2203/172* (2015.10); *B23K 2203/52* (2015.10); *C04B 2235/6565* (2013.01); *C04B 2235/6581* (2013.01); *C04B 2235/665* (2013.01); *C04B 2235/786* (2013.01); *C04B 2235/96* (2013.01); *C04B 2237/122* (2013.01); *C04B 2237/124* (2013.01); *C04B 2237/126* (2013.01); *C04B 2237/127* (2013.01); *C04B 2237/343* (2013.01); *C04B 2237/592* (2013.01); *C04B 2237/60* (2013.01); *C04B 2237/708* (2013.01)

(56) References Cited

U.S. PATENT DOCUMENTS

| | | | |
|---|---|---|---|
| 6,267,009 B1 | 7/2001 | Drewes | |
| 6,363,790 B1 * | 4/2002 | Flogel | G01L 9/0075 361/283.4 |
| 7,707,891 B2 | 5/2010 | Antila | |
| 9,459,169 B2 * | 10/2016 | Selders | G01L 9/0075 |
| 2010/0064816 A1 | 3/2010 | Filippi | |
| 2012/0258322 A1 * | 10/2012 | Berlinger | C04B 37/006 428/450 |
| 2012/0299127 A1 * | 11/2012 | Fujii | B60C 23/0488 257/415 |
| 2013/0327151 A1 * | 12/2013 | Berlinger | G01L 9/00 73/756 |
| 2015/0135844 A1 * | 5/2015 | Ponath | B23K 1/0008 73/724 |
| 2015/0160086 A1 * | 6/2015 | Ponath | B23K 1/0008 73/724 |
| 2015/0298264 A1 * | 10/2015 | Rossberg | B23K 35/32 73/723 |
| 2015/0362392 A1 * | 12/2015 | Tanida | G01L 9/0051 73/725 |

FOREIGN PATENT DOCUMENTS

| | | |
|---|---|---|
| EP | 0490807 A2 | 6/1992 |
| EP | 1010973 A1 | 6/2000 |
| WO | 2009155716 A1 | 12/2009 |
| WO | 2011003730 A1 | 1/2011 |

OTHER PUBLICATIONS

Lei Ming, Dih Liu Yea, Shu Jin Fong, "Formation Regulator Pattern of Al2O3f/ADC12 Composite Material Energy-Storing Welding Head Tissue", Transactions of the China Welding Institution, vol. 28, No. 4, Apr. 2007, China.

German Search Report, German Patent Office, Munich, dated Dec. 15, 2011.

International Search Report, EPO, The Netherlands, dated May 4, 2012.

* cited by examiner

CERAMIC PRESSURE MEASURING CELL AND METHOD FOR ITS MANUFACTURE

TECHNICAL FIELD

The present invention relates to a ceramic pressure measuring cell and a method for its manufacture.

BACKGROUND DISCUSSION

Ceramic pressure measurement cells of the field of the invention comprise a ceramic platform and a ceramic measuring membrane, wherein the platform and the measuring membrane are joined with one another along a peripheral seam such that a measuring chamber is formed between the platform and the measuring membrane, wherein the joint comprises an active hard solder, or braze. An established ceramic material for measuring membranes and the platform is corundum, wherein as active hard solder, or braze, especially a Zr63Ni22Ti15 active hard solder, or braze, is used.

For joining the components, they are arranged in the desired position relative to one another in a high vacuum oven and heated, until the active hard solder, or braze, melts at 900° C. and actively forms a bond with the ceramic. Following the melting, the pressure measuring cell is allowed to cool in the furnace under vacuum and, in given cases, at times, with the addition of a protective gas.

From calorimetric measurements performed on the solder, it is known that the liquidus temperature lies at about 860° C. and the solidus temperature at about 800° C. The crystallizing of phases from the melt takes place in this temperature range. Other phase formations are possible below the solidus temperature. It is known that always the same thermodynamic phases form.

Investigations with reflection electron microscopy (REM) on sections through joints have led to determining that different segregated phases take up large regions within the joint. Since this involves phases with a different composition, it is to be assumed that they differ in properties, such as the thermal coefficients of expansion, and compressive, respectively tensile, strengths. As a result, the quality of the joint can be degraded as regards strength, sealing, and/or manufacturing yield.

SUMMARY OF THE INVENTION

It is, consequently, an object of the invention to provide a pressure measuring cell with an improved joint and a method for its manufacture.

The object is achieved according to the invention by the method which has a ceramic platform and a ceramic measuring membrane, wherein the measuring membrane is joined with the platform pressure tightly by means of an active hard solder, or braze, the method comprising: providing the platform, the measuring membrane and the active hard solder, or braze; positioning the active hard solder, or braze, between the platform and the measuring membrane; melting the active hard solder, or braze, by irradiating the active hard solder, or braze, by means of a laser, wherein the irradiating of the active hard solder, or braze, occurs through the measuring membrane; and letting the active hard solder, or braze, solidify by cooling.

In a further development of the invention, the melted active hard solder, or braze, is held at or above the liquidus temperature for not more than 1 minute, especially not more than 30 seconds, preferably not more than 15 seconds.

The liquidus temperature is the temperature, above which the active hard solder, or braze, is completely liquid, thus no longer contains solid phases.

In a further development of the invention, the letting the active hard solder, or braze, solidify by cooling occurs down to the solidus temperature with an average cooling rate of not less than 20 K/minute, especially not less than 40 K/minute, preferably not less than 1 K/second, and especially preferably not less than 2 K/second.

The solidus temperature is the temperature, below which the active hard solder, or braze, contains no liquid phase.

In a further development of the invention, the cooling occurs down to a temperature of 100K below the solidus temperature, preferably 200K below the solidus temperature, with an average rate of not less than 20 K/minute, especially not less than 40 K/minute, preferably not less than 1 K/second, and especially preferably not less than 2 K/second.

In a further development of the invention, the cooling is supported by providing the pressure measuring cell with a noble gas, especially argon.

The invention proceeds from the idea that, with local heating of the active hard solder, or braze, by irradiating with a laser, the heat input is so small that a fast cooling of the melt can occur. Then there is less time available for nucleation and growth of segregated phases in the joint, so that the segregated phases, to the extent that such are present at all, are smaller and therewith less determining for the behavior of the joint.

In a further development of the invention, the irradiating of the active solder by means of a laser occurs at a wavelength, at which the ceramic material of the measuring membrane does not absorb or, at most, negligibly absorbs, wherein the wavelength especially lies in the visible region. A negligible absorption in the sense the invention is especially present, when at least 90%, especially at least 95%, of the intensity of the light entering into the measuring membrane at an upper surface the measuring membrane reaches a lower surface of the measuring membrane parallel to the upper surface, wherein the lower surface is especially that, which contacts the active hard solder, or braze.

In a further development of the invention, the platform and the measuring membrane are heated completely, at least, however, locally in the region of the joint, to a temperature, which lies not more than 200 K, especially not more than 100 K and preferably not more than 50 K below the solidus temperature of the active hard solder, or braze.

The platform and the measuring membrane should, however, in no case be preheated up to the liquidus temperature of the active hard solder, or braze, and, according to a further development of the invention, not over the solidus temperature of the active hard solder, or braze.

In a further development of the invention, the preheating occurs by means of a laser in a wavelength range, in which the ceramic material of the platform, or the measuring membrane, absorbs, especially by means of a Nd-YAG laser or a CO2 laser.

In a further development of the invention, the preheating occurs by means of an oven, in which the components are arranged.

In a further development of the invention, the melting of the active hard solder, or braze, and the letting the active hard solder, or braze, solidify, occur at least at times under vacuum and/or protective-gas, especially argon.

In a further development of the invention, the ceramic material of the platform and the measuring membrane comprises corundum.

The measuring membrane can, in such case, especially comprise corundum of higher purity and a higher ultimate tensile strength than that used for the platform. In a further development of the invention, the measuring membrane comprises a highly pure $Al_2O_3$ ceramic, which is especially distinguished by a very low density of scattering centers in the visible wavelength range, so that the ceramic material of the measuring membrane is essentially transparent in this wavelength range. Therewith, controlled irradiating of the active hard solder, or braze, can occur especially easily through the measuring membrane.

A corresponding ceramic material suitable as a membrane material is disclosed, for example, in the German patent document DE 10 2008 036 381 B3.

In a further development of the invention, the material of the measuring membrane can have a transverse rupture stress $\sigma_c$, whose distribution $F(\sigma_c)$ is given by the Weibull-parameter $\sigma_0 \geq 500$ MPa, especially $\sigma_0 \geq 650$ MPa, preferably $\sigma_0 \geq 800$ MPa, and $m \geq 24$, and an average grain size of the sintered material of not more than 2 μm, preferably not more than 1.75 μm and especially preferably not more than 1.5 μm.

Exactly for these high strength measuring membranes, the method of the invention for joining the measuring membrane is of great importance. Thus, the invention improves the strength of the joint, and therewith, a correspondence between measuring membrane and joint is present.

The pressure measuring cell of the invention, which is especially obtainable according to the method of the invention, comprises a ceramic platform and a ceramic measuring membrane, wherein the measuring membrane is connected with a surface of the platform by means of a peripheral joint to form a measuring chamber between the surface of the platform and the measuring membrane, wherein the joint comprises an active hard solder, or braze, wherein, to the extent that the joint contains any segregated, especially granularly segregated, phases of the active hard solder, or braze, these phases, especially granularly segregated phases, have a maximum extent in a direction perpendicular to the surface of the platform of not more than 4 μm, especially not more than 2 μm and preferably not more than 1 μm.

The ceramic measuring membrane and the ceramic platform of the pressure measuring cell comprise according to the invention corundum, wherein the active hard solder, or braze, comprises a Zr—Ni—Ti active hard solder, or braze, or a Cu—Ti—Zr—Ni active hard solder, or braze.

In a currently preferred embodiment of the Zr—Ni—Ti active hard solder, or braze, such has the following composition: Zr 63%, Ni 22%, and Ti 15%. In a currently preferred embodiment of the Cu—Ti—Zr—Ni active hard solder, or braze, such has the following composition: Cu 47%, Ti 34%, Zr 11%, Ni 8%. All %-data in this paragraph are atomic %.

The pressure measuring cell of the invention can be an absolute-, relative- or pressure difference measuring cell.

The pressure measuring cell of the invention includes, furthermore, a transducer for transducing a pressure dependent deformation of the measuring membrane into a signal, especially an electrical or optical signal. Currently, capacitive transducers are preferred as electrical transducers, wherein, for this, the measuring membrane and the platform have electrodes on their surfaces bounding the measuring chamber, and wherein the capacitance between the electrodes is pressure dependent.

BRIEF DESCRIPTION OF THE DRAWINGS

The invention will now be explained based on the drawing, the figures of which show as follows.

DETAILED DISCUSSION IN CONJUNCTION WITH THE DRAWINGS

Figure 1:
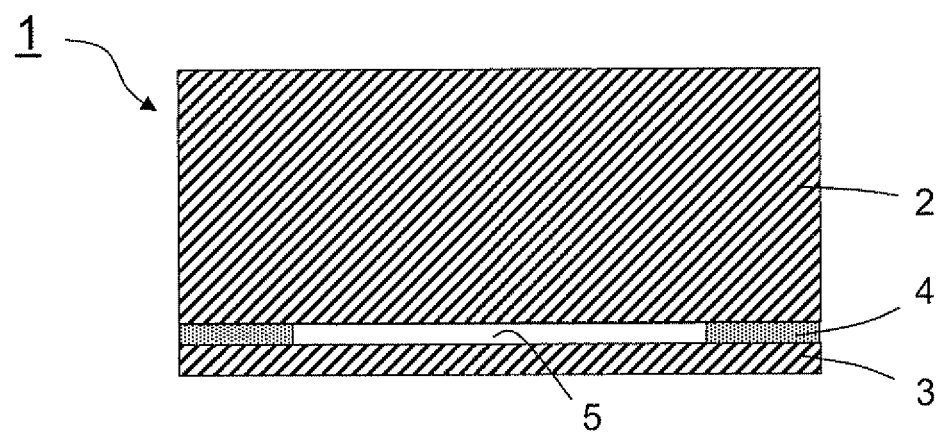
FIG. 1 is a longitudinal section through a pressure measuring cell of the field of the invention.

The ceramic pressure measuring cell 1 shown in FIG. 1 includes a cylindrical platform 2 of corundum with a diameter of, for example, 1 to 7 cm and a height of 3 mm to 3cm. Joined pressure tightly to the platform via a ring-shaped, surrounding joint 4 is a measuring membrane 3 of highly pure corundum, wherein the joint 4 comprises an active hard solder, or braze, especially a Zr—Ni—Ti active hard solder, or braze. The height of the joint 4 predetermines a separation between the measuring membrane and the platform, wherein this separation can be, for example, 10 μm to 80 μm. The width of the annular joint 4, thus the difference between the inner radius and outer radius, amounts to a few mm. Formed between the measuring membrane 3 and the platform 2 is a measuring chamber 5 surrounded by the joint 4, wherein the pressure measurement occurs relative to the pressure in the measuring chamber, wherein pressure to be measured acts on the side of the measuring membrane facing away from the measuring chamber 5. The thickness of the measuring membrane depends on its diameter and on the desired measuring range. The thickness can range, for example, from 50 μm to 3 mm.

Figure 2:
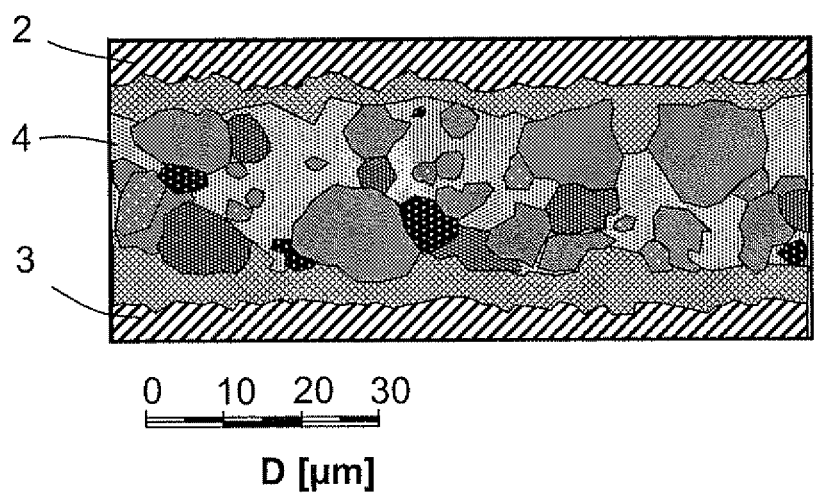
FIG. 2 is a longitudinal section through a joint of a pressure measuring cell of the field of the invention.
Figure 3:
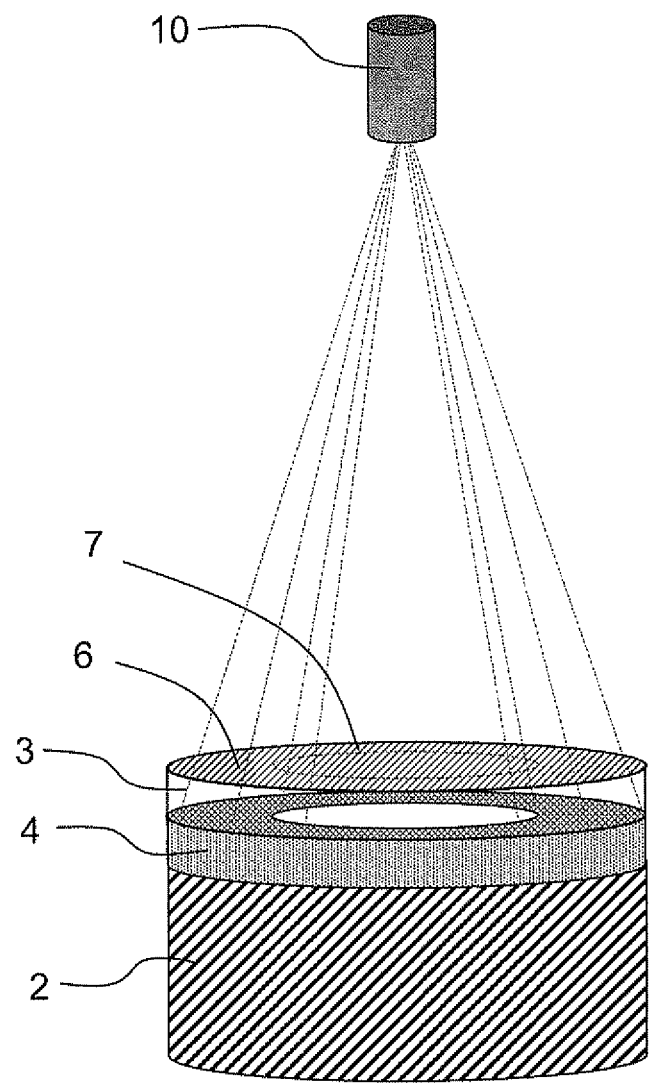
FIG. 3 is an illustration of a pressure measuring cell of the invention during manufacturing according to the method of the invention.

FIG. 2 is a schematic view at a greater magnification of a longitudinal section through a joint having a thickness of, for instance, 30 μm, such as exists in the case of a pressure measuring cell of the field of the invention. The drawing is based on an REM picture. The joint 4 between the platform 2 and the measuring membrane 3 has different structures, of which some granularly segregated phases have a diameter of more than 10 μm. The different hatching should not be interpreted as indicating uniquely defined phases; rather, it only shows that a plurality of granularly segregated phases is present in a probably amorphous matrix. The shown size distribution corresponds directly to observation. In order to shorten the time for nucleation and growth of the segregated phases, the pressure measuring cell is manufactured according to the method of the invention, such as will now be explained based on FIG. 3.

Arranged on the platform 2 of corundum is a ring 4 of active hard solder, or braze, wherein the ring is preferably in the form of a solder preform. In a further development of the invention, the ring can, however, also be at least partially provided by gas phase deposition on the platform 2.

Then there is placed on the solder ring 4 a measuring membrane 3 of highly pure corundum, wherein the measuring membrane 3, firstly, scarcely absorbs in the visible spectral range, and, secondly, has scarcely any scattering centers.

The active hard solder, or braze, 4 is irradiated through the measuring membrane 3 from the upper side of the pressure measuring cell with a $CO_2$ laser or another suitable laser 10, wherein preferably only an outer edge region 6 of the face of the measuring membrane outside a contour line 7 is irradiated, wherein the contour line 7 is defined by the inner radius of the ring 4 of active hard solder, or braze, and wherein rays of the laser 10 striking the outer edge region 6 of the measuring membrane 3 pass through the measuring membrane 3 and strike the ring 4 of active hard solder, or braze, in order to heat such.

The laser beam can especially be moved in a raster pattern and/or pulsed.

The temperature of the active hard solder, or braze, can be monitored especially pyrometrically.

The platform and the measuring membrane can be heated, independently of the irradiating of the active hard solder, or braze, with a Nd-YAG laser or the like to a temperature near the solidus temperature of the active hard solder, or braze. The monitoring of the platform temperature and the measuring membrane temperature can likewise occur pyrometrically.

A heating of the platform and the measuring membrane to, for example, the solidus temperature of the active hard solder, or braze, leads to the fact that, upon solidification of the active hard solder, or braze, the mechanical stresses between the solder and the ceramic components are limited.

After the active hard solder, or braze, has reached the liquidus temperature, so that it is melted, the cooling can begin, which, due to the, compared to the state of the art, smaller introduced amounts of heat, can occur faster. Therewith, the temperature ranges, in which nucleation and growth of segregating phases can occur, are passed through faster. The size of such segregated, especially granular, phases is, therewith, significantly reduced.

The joining of the measuring membrane with the platform occurs preferably under vacuum at a pressure of not more than $5\times10^{-6}$ mbar. For cooling, argon can be introduced into the vacuum apparatus, in order to increase the cooling rate.

The invention claimed is:

1. A method for manufacturing a pressure measuring cell, which has a ceramic platform and a ceramic measuring membrane, wherein the measuring membrane is joined with the platform pressure tightly by an active hard solder, or braze, the method comprising:
providing the platform, the measuring membrane and the active hard solder, or braze;
positioning the active hard solder, or braze, between the platform and the measuring membrane;
melting the active hard solder, or braze, by irradiating the active hard solder, or braze, by a laser, wherein the irradiating of the active hard solder, or braze, occurs through the measuring membrane; and
letting the active hard solder, or braze, solidify by cooling.

2. The method as claimed in claim 1, wherein:
said melted of the active hard solder, or braze, is held at or above the liquidus temperature not more than 1 minute, especially not more than 30 seconds, preferably not more than 15 seconds.

3. The method as claimed in claim 1, wherein:
said letting of the active hard solder, or braze, solidify by cooling occurs down to the solidus temperature with an average cooling rate of not less than 20 K/minute, especially not less than 40 K/minute, preferably not less than 1 K/second, and especially preferably not less than 2 K/second.

4. The method as claimed in claim 3, wherein:
the further cooling occurs down to a temperature of 100K below the solidus temperature, preferably 200K below the solidus temperature, with an average rate of not less than 20 K/minute, especially not less than 40 K/minute, preferably not less than 1 K/second and especially preferably not less than 2 K/second.

5. The method as claimed in claim 1, wherein:
said cooling is supported by providing the pressure sensor with a noble gas, especially argon.

6. The method as claimed in claim 1, wherein:
said irradiating of the active solder occurs by means of a laser at a wavelength, at which the ceramic material of the measuring membrane does not absorb or, at most, negligibly absorbs, wherein the wavelength especially lies in the visible region.

7. The method as claimed in claim 1, wherein:
the platform and the measuring membrane are heated at least locally in the region of the joint to a temperature, which lies not more than 200 K, especially not more than 100 K and preferably not more than 50 K below the solidus temperature of the active hard solder, or braze.

8. The method as claimed in claim 7, wherein:
the preheating occurs by a laser in a wavelength range, in which the ceramic material of the platform, or the measuring membrane, absorbs, especially by means of a Nd-YAG laser or a $CO_2$ laser.

9. The method as claimed in claim 7, wherein:
the preheating occurs by an oven, in which the components are arranged.

10. The method as claimed in claim 1, wherein:
the melting of the active hard solder, or braze, and the letting of the active hard solder, or braze, solidify occur at least at times under vacuum and/or protective-gas, especially argon.

11. The method as claimed in claim 1, wherein:
the ceramic material of the platform and the measuring membrane comprise corundum.

12. The method as claimed in claim 1, wherein:
the ceramic material of the measuring membrane is essentially transparent.

13. A pressure measuring cell, comprising:
a ceramic platform; and
a ceramic measuring membrane, wherein:
said measuring membrane is connected with a surface of said platform by a peripheral joint to form a measuring chamber between the surface of said platform and said measuring membrane;
said joint comprises an active hard solder, or braze, wherein, to the extent that the joint contains any segregated, especially granularly segregated, phases of the active hard solder, or braze, these segregated phases have a maximum extent in a direction perpendicular to the surface of said platform of not more than 4 µm, especially not more than 2 µm and preferably not more than 1 µm.

14. The pressure measuring cell as claimed in claim 13, wherein:
said ceramic measuring membrane and said ceramic platform comprise corundum; and
said active hard solder, or braze, comprises a Zr—Ni—Ti active hard solder, or braze, or a Cu—Ti—Zr—Ni active hard solder, or braze.

* * * * *